July 14, 1931.  A. SCHWARZ  1,814,062
PROCESS FOR EXTRACTING A METAL FROM ITS ORE
Filed Sept. 19, 1928
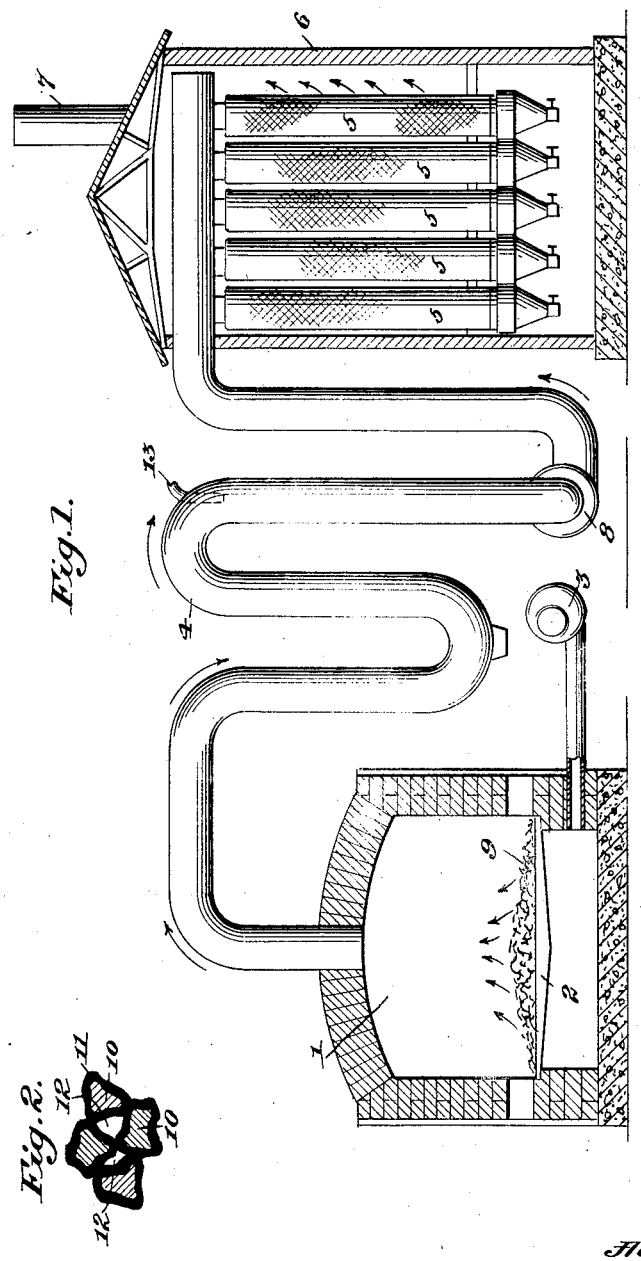
Inventor:
Alfred Schwarz, Patented July 14, 1931

1,814,062

UNITED STATES PATENT OFFICE

ALFRED SCHWARZ, OF MONTCLAIR, NEW JERSEY

PROCESS FOR EXTRACTING A METAL FROM ITS ORE

Application filed September 19, 1928. Serial No. 306,906.

My invention relates to a process of and apparatus for extracting a metal from its ore, and it is an object of my invention to improve and simplify processes and apparatus of this character. A more specific object is to extract zinc from a sulphurous ore, in the form of a sulphur compound, such as a sulphate, and subsequently to produce, if desired, an oxide. It is particularly adapted for the treatment of zinc ores.

It is well known that a sulphurous zinc ore, such as blende (zinc sulphide), is difficult to treat for the production of zinc oxide, especially when complicated by the presence of other metals such as iron, copper, gold, etc. The result has been that mines producing complex sulphurous ores containing zinc are oftentimes unworkable on a commercial scale, due to the expense and difficulty of separating the metals from each other.

I have found that zinc, for example, may be converted into a sulphur compound, such as a sulphate, easily and quickly, if the zinc is volatilized in the presence of oxygen and vapors bearing sulphur and water. This may conveniently be done by heating the sulphurous (sulphur-bearing) ore until the metal and sulphur are vaporized, and supplying steam and air during the process. The sulphate produced may then be converted into the oxide, if desired, or otherwise treated.

As a specific example of my process, I have proceeded as follows: A complex sulphide ore containing copper, lead, zinc, silver and gold was pulverized so as to pass through a 60 mesh screen. A suitable reducing agent such as soft coal was then pulverized to pass through a 100 mesh screen. The two were then put into a mixing vessel, preferably a kneading machine; and to it was added a binder, preferably a colloidal substance capable of aiding the coal, for example, in the production of coke, such as ordinary starch paste produced by dissolving pulverized starch in boiling water. From 20 to 40 lbs. of starch and about 1,000 lbs. of coal per ton of ore may be used. Approximately 1,000 lbs. of water per ton of ore may be added to the starch. These quantities or proportions are not essential. The entire mixture is then well kneaded in a kneading machine, and may be passed from there into a shreadding machine.

If this were then charged into the furnace, it would form a mass which might not be sufficiently permeable by the air and gases. I therefore preferably proceed as pointed out in my application Ser. No. 328,905, filed October 6, 1919. A refractory material, such for example as slag remaining from a previous operation, may be broken up into irregular pieces about a half-inch in diameter and finer, to act as a distributor for the charge. An amount of such slag sufficient to form air passages in the charge is then put into a pug-mill with the mixed ore, coal and binder above specified, and thoroughly mixed. This coats the particles of slag with thin layers of the intimately mixed material, which adheres to the particles, and when the same is charged into a furnace loosely, many air passages are provided through the mass, sufficient for the passage of the air, etc. I am aware that various apparatus may be used to carry out my process. In the drawings I have illustrated one form of apparatus which may be used.

Fig. 1 is a side elevation partly in section; and

Fig. 2 is a detail.

Fig. 2 shows an enlarged diagram of a portion of the mass in which 10—10 are pieces of slag coated with layers 11 of the material to be burned and provided with air passages 12 therethrough.

In the drawings, 1 is a furnace provided with a grate 2. On this grate is placed kindling wood and coal, over which is then placed a loosely assembled bed 9 of the prepared material. The kindling wood is then ignited and air blown through the grate by means of the blower 3. Suction may also be employed, such as by centrifugal fan 8, if desired. After a few minutes the charge begins to burn. Then and continuously thereafter steam should be supplied if a sulphate is desired. This is illustrated in the drawings by the steam jet 13 connected with any suitable source of steam (not shown). I find that a greater yield of sulphate is provided if the steam is supplied to the vapors at a point where the temperature is considerably below the temperature at which volatilization of the metal takes place, instead of being blown through the burning mass. In the production of zinc sulphate, this temperature may be advantageously around 600° C., and the steam may be introduced as indicated at 13, at a point in the cooling pipe which is at the desired temperature. The gases produced through the cooling pipe 4 into the usual collecting bags 5, formed of muslin or other fabric, in the bag house 6, in which the material carried over will be deposited, the air passing out through the interstices and a chimney, such as 7. Under some conditions it may be advantageous to superheat the steam.

Depending upon the combustion temperature employed which, if zinc sulphate is desired, may be around 1200° C. or less, the sulphur, zinc, cadmium, and some silver and lead if present, will be vaporized and will combine to form sulphates, leaving the iron, gold, copper, etc. behind in the resulting slag or cinder. I am not sure just what the reactions in the furnace are, but I now believe that the zinc is not reduced (extracted as metallic zinc) from the sulphide ore by the coal but that ZnO and $SO_2$ are produced, the former being then reduced by the coal to Zn and $CO_2$, and that the $SO_2$ gas combines with the $H_2$ (steam) and with oxygen from the air into $H_2SO_4$ vapors which attack the zinc oxide vapors and produce $ZnSO_4$ with formation of water. It may be that the reaction is directly

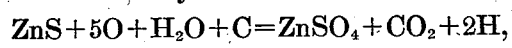

but probably the reaction is not so simple. When I speak of volatilizing the sulphur or of sulphur vapors, I do not mean necessarily that the sulphur is volatilized in its elemental state, that is, without combination with other elements. Apparently in most cases the sulphur is evolved in the form of $SO_2$ or other combinations. I, therefore, do not limit myself in this respect. Whatever may be the fact as to the reactions, a sulphate results.

If desired, the zinc sulphate may be separated and then converted into the oxide. The collected sulphates may be separated by putting them into an agitating tank filled with warm water. Lead sulphate, being nearly insoluble in water, will settle to the bottom after the agitation is stopped. The zinc sulphate, together with part of the cadmium and silver sulphates present, will go into solution. The liquid may then be drawn off through a filter press, thus separating out the lead sulphate. If the liquid is then treated with zinc shavings, it will precipitate the silver and cadmium, leaving the zinc sulphate in solution. The liquid may be passed through a filter press and the zinc then separated, for example by adding soda ash, calcium hydroxide or some similar agent, which will precipitate the zinc in the form of a hydroxide.

If desired, this salt may be converted into an almost chemically pure zinc oxide by mixing it with coal, binder and broken slag and reburning it as above set forth, but without the steam.

I am aware that my process may be carried out for the extraction of other metals than zinc, and may be widely varied from what is above disclosed without departing from the scope of my invention. I therefore do not limit myself to the particular features above set forth in detail.

What I claim is:

1. The process of extracting a metal from its sulphurous ore, which consists in heating the ore in the presence of a reducing agent sufficiently to vaporize the metal and sulphur, and applying steam and air, thereby converting the metal into its sulphate.

2. The process of extracting zinc from its sulphurous ore, which consists in heating a mass of ore and a reducing agent until the zinc and sulphur are vaporized, and supplying steam and air, thereby converting the zinc into its sulphate.

3. The process of producing zinc oxide from a sulphurous zinc ore, which consists in heating the ore and a reducing agent until the zinc and sulphur are vaporized, supplying steam and air thereby converting the zinc into a sulphate, dissolving the soluble salts produced, precipitating a zinc compound from the solution, and burning said zinc compound in the presence of air and a reducing agent to convert the same into zinc oxide.

4. The process of producing zinc oxide from a complex sulphurous zinc ore, which consists in heating the ore and a reducing agent until the zinc and sulphur are vaporized, supplying steam and air, thereby converting the zinc into a sulphate, dissolving the soluble salts produced, treating the solution with a substance which will precipitate silver therefrom, precipitating a zinc compound from the solution in the form of a substantially non-sulphurous compound, and burning said zinc compound in the presence of air and a reducing agent to convert the same into zinc oxide.

ALFRED SCHWARZ.